(12) United States Patent
Gharda et al.

(10) Patent No.: US 6,881,816 B2
(45) Date of Patent: Apr. 19, 2005

(54) MELT PROCESSIBLE POLYETHER ETHER KETONE POLYMER

(75) Inventors: Keki Hormusji Gharda, Mumbai (IN); Prakash Druman Trivedi, Mumbai (IN); Venkat Srinivasan Iyer, Maharashtra (IN); Utpal Mahendra Vakil, Mumbai (IN); Sanjav Chintaman Limaye, Maharastra (IN)

(73) Assignee: Gharda Chemicals Ltd., Mumbai (IN)

( * ) Notice: Subject to any disclaimer, the term of this patent is extended or adjusted under 35 U.S.C. 154(b) by 0 days.

(21) Appl. No.: 10/387,440

(22) Filed: Mar. 14, 2003

(65) Prior Publication Data

US 2003/0176635 A1 Sep. 18, 2003

Related U.S. Application Data

(62) Division of application No. 09/886,471, filed on Jun. 22, 2001, now Pat. No. 6,566,484.

(30) Foreign Application Priority Data

Jul. 6, 2000 (GB) .............................................. 0016527

(51) Int. Cl.$^7$ .......................... C08G 65/38; C08G 65/44
(52) U.S. Cl. ....................... 528/220; 528/487; 528/491; 528/499
(58) Field of Search ................................ 528/220, 487, 528/491, 497, 499

(56) References Cited

U.S. PATENT DOCUMENTS 4,247,682 A    1/1981   Dahl

FOREIGN PATENT DOCUMENTS

| GB | 2116990 A | 10/1983 |
|----|-----------|---------|
| GB | 2138433 A | 10/1984 |
| GB | 2172294 A | 9/1986  |

OTHER PUBLICATIONS

Zhang et al.; Control of the molecular weight of PEEK and the effects of terminal groups on the thermal stability; 1993; Jilin Daxue Ziran Kexue Xuebao (1993), 1, pp. 116–118; CAS abstract.

Colquhoun, H.M. et al., "Synthesis of aromatic polyether-ketones in trifluoromethanesulphonic acid", POLYMER, vol. 29, pp. 1902–1908, (Oct. 1988), XP–000986259.

Ueda, M., et al., Synthesis of Aromatic Poly(ether ketone) s in Phosphorus Pentoxide/Methanesulfonic Acid, Polymer Journal, vol. 21, No. 9, pp. 673–679 (1989), XP–000996584.

*Primary Examiner*—Duc Truong
(74) *Attorney, Agent, or Firm*—Nath & Associates PLLC; Harold L. Novick; Joshua B. Goldberg

(57) ABSTRACT

A melt processible Polyether Ether Ketone (PEEK) polymer with novel end-group structure is synthesized electrophilically using Methane Sulfonic Acid containing Methane Sulfonic Anhydride or Phosphorous Pentoxide. The product so obtained shows controlled structure with elimination of reactive end group like —COOH and is therefore melt processible by conventional techniques and exhibits high thermal and mechanical properties making it useful high temperature engineering and specialty plastics. It can be extruded into a rod, film and can also be molded into commercially useful products.

3 Claims, No Drawings

MELT PROCESSIBLE POLYETHER ETHER KETONE POLYMER

This application is a divisional application of U.S. patent application Ser. No. 09/886,471 filed Jun. 22, 2001 now U.S. Pat. No. 6,566,484 entitled Melt Processible Polyether Ether Ketone Polymer, the entire contents of which are hereby incorporated by reference in their entirety.

BACKGROUND OF THE INVENTION

Thermoplastic aromatic Polyether Ketone derivatives, such as Polyether Ether Ketone (PEEK), are well known to the art. These polymers have melting points greater than 330° C., continuous use temperatures of 260° C. or more and high mechanical strengths, such as tensile strength greater than 85 MPa. They have significant commercial utility as plastics, especially as molded articles and as composites with glass/carbon/Kevlar fibres for a variety of structural applications including in aerospace and general engineering industries. PEEK also finds applications as extruded rods and profiles for manufacture of bushings, seals, etc. In general, they are processed using extruders and injection molding machines in temperature range of 360–400° C., thus requiring extremely high thermal stability.

Literature teaches us two major processes, nucleophilic and electrophilic, for the production of thermoplastic aromatic Polyether Ether Ketone. One is described by Johnson et al, (J. Polymer Sci. 5, A-1, 2375 1967). This nucleophilic route employs hydroquinone and dihalobenzophenone along with a base, in solvents like N-Methyl-Pyrrolidone or Sulfolane, at temperatures of about 200–250° C. The PEEK so produced, however, is found to be of low molecular weight [Inherent Viscosity (Inh. V.)<0.7 dl/g] and cannot be used as a molded plastic due to it's low mechanical properties.

An improvement on this product and process (U.S. Pat. No. 4,320,224/GB 1586 972), involving nucleophilic route is brought about by employing a high boiling solvent Diphenyl Sulfone. In this reaction hydroquinone is transformed into its di-potassium salt by heating with an equivalent amount of potassium carbonate or potassium bicarbonate, with simultaneous removal of the water at 150–200° C., followed by addition of the second monomer, namely, 4,4'-difluoro benzophenone. The polymerization reaction is carried out at 320–350° C. to obtain polymer of desired Inh.V. range of 0.8 to 1.4 dl/g with melting point of 335–350° C. PEEK so produced has structure as well known in the art as given below with two fluoride end-groups.

This process is commercially utilised today. It, however, has several drawbacks. First, it uses expensive raw materials containing Fluorine and Potassium, both of which end up as a by-product to be separated from PEEK. It also requires use of very high temperatures for organic reactions, like 300° C. and above. The use of such high temperature also brings about some charring of material requiring special melt filtration of the PEEK polymer to remove black specs formed during the manufacturing process. The formation of a stoichiometric amount of Potassium Fluoride as a by-product, requires elaborate salt separation procedures to obtain the polymer in pure form. The Diphenyl Sulfone solvent used has a high melting point of 129° C., which makes it inconvenient to process it except at high temperatures. Diphenyl Sulfone is further immiscible with water, hence requiring use of non-aqueous systems for precipitation of the polymer, making its removal from the reaction mass cumbersome.

Hence a process of PEEK manufacturing which can be carried out at lower temperatures, where PEEK can be precipitated in water instead of non-aqueous non-solvents and where recycling of by-products is feasible is most desirable.

Another route for production of thermoplastic aromatic Polyether Ketones like PEEK, involves use of Friedel-Crafts catalysts (electrophilic process). For example, European Patent No. 0174207 teaches the use of $AlCl_3$ for the polymerization of a carboxylic acid chloride derivative of Phenoxy Benzoic Acid (PBA) and Phenoxy Phenoxy Benzoic Acid (PPBA) to give Polyether Ketone (PEK) and Polyether Ether Ketone (PEEK) respectively. The process, though carried out at low temperatures such as 0–30° C., uses $AlCl_3$ in $CH_2Cl_2$ solution. Due to the heterogeneous nature of this reaction, generally undesirable lower molecular weight polymers are produced. PEEK polymer obtained by this process is, also, predominantly non-linear and show a high degree of branching. These defects lead to a lowering of the melting point from greater than 330° C. to 315–320° C. There is also reduction of mechanical strength of the polymer formed. It also leads to a significant reduction in its ability to withstand high processing temperatures of 350–400° C. without getting cross-linked. Such a PEEK, therefore, can neither be processed nor be used as a high performance plastic.

Further, the system is highly moisture sensitive due to excess $AlCl_3$ as well as the acid chlorides used as raw materials. Additionally, the precipitation treatment of the reaction mass to liberate the polymer from the catalyst $AlCl_3$ with water involves the liberation of large quantity of HCl gas, which forms effluent. The catalyst $AlCl_3$ used becomes an environmental burden, being non-recyclable and producing huge quantities of effluents containing Al salts. The process itself is also therefore difficult and inconvenient to carry out with no stringent controls for molecular weights.

Another electrophilic process exemplified by Ueda and Oda uses Methanesulfonic acid (MSA)/Phosphorous pentoxide ($P_2O_5$) [JOC 38, 4071, 1973, and Polymer 29, 1903, 1983] at low temperatures like 60° C. Inh.V. as high as 1.08 dl/g was obtained. They teach the use of a 1:10 solution by weight of $P_2O_5$ in MSA. A mixed anhydride is proposed as the active reagent. While PEEK so produced has less branched structure than one produced using $AlCl_3$ system, it also suffers, like the later, from high temperature instability and hence cannot be molded or extruded without extensive cross-linking and degradation.

Colquhoun has suggested use of Trifluoromethane Sulfonic acid as the reaction medium to polymerize PPBA to give PEEK. (Polymer Preprints, 25, 17, 1984). It has also remained only of academic interest due to the extremely high cost and corrosive nature of the solvent used. Also, in all these above mentioned electrophylic processes, reactive end groups were present. It is part of this invention that PEEK so produced with such reactive groups, like —COOH, present cannot be processed, without endcapping, using traditional plastic processing techniques due to its high thermal instability. Such PEEK on being subjected to high temperature processing immediately cross-links producing gels, which cannot be shaped into desired articles. Therefore, PEEK production by electrophilic processes as described above has not been commercially successful owing to so many inherent limitations involved.

In U.S. Pat. No. 4,247,682 (1981) Dahl has described processes for the condensation of p-phenoxy benzoyl chloride and p-phenoxy benzene sulfonyl chloride in HF using BF$_3$ as a catalyst and using biphenyl or benzoyl chloride as end-capping agents to prepare PEK and PES. These end-capping groups were reported to help maintain the polymer melt stability during extrusion in the absence of which the polymer was reported to degrade readily.

In yet another patent, U.S. Pat. No. 4,808,693 (1989) Dahl, Jansons and Moore have described a process for the condensation of terephthalolyl chloride with Diphenyl ether and diphenoxy benzene using AlCl$_3$/EDC system to yield a copolymer of PEKK and PEEKK. Here too, the authors have highlighted the role of the relative ratio of the two electrophilic agents, where higher diphenoxy benzene quantity has increased thermal stability. It may be assumed that use of a given electrophylic system as well as the monomers employed also played a part in determining final structure giving higher thermal stability of the product.

No mention has been made, by the above mentioned authors or to the best of our knowledge by anyone else, for polymerization of phenoxy phenoxy benzoic acid (PPBA) to yield a melt stable and thermally processible Polyether Ether Ketone (PEEK).

In our studies we have found that not only is the nature of the repeat unit critical for obtaining good thermal and mechanical properties, but the nature of the end-group is also critical for attaining desired thermal stability. By manipulating end-groups, it is now possible to prepare electrophilically, novel PEEK structures which show excellent thermal stability and are therefore inherently melt processible.

SUMMARY OF THE INVENTION

The present invention relates to the preparation of novel Polyether Ether Ketone (PEEK) by an improved electrophilic route. The PEEK so made contains un-reactive end-groups making it thermally stable and melt processible. It is hence mouldable and extrudable and useful as a plastic. Further, the process of preparation is not only novel but is very facile and can be made into a manufacturing process. This is because of lower temperature of polymerization, use of readily recyclable reagents, use of water as non-solvent and in general because of overall ease of processing.

DESCRIPTION OF THE INVENTION

The process involves reacting phenoxy phenoxy benzoic acid (PPBA) in alkane sulfonic acid with a condensing agent, with or without a diluent at 40° to 160° C. and subsequently endcapping it with a suitable endcapping agent. The alkane sulfonic acid used can be any aliphatic sulfonic acid including haloalkane sulfonic acid, preferably Methane Sulfonic acid (MSA), Trifluoro or Trichloro Methane Sulfonic acid. The condensing agents used for example are Thionyl Chloride, Phosphorous trichloride, Phosphorous pentachloride or Phosphorous pentoxide, Methane Sulfonic Anhydride or their mixtures. The diluent is, for example, a non-polar aprotic solvent such as Methylene Chloride, Ethylene Dichloride, or Sulfolane, or their mixtures or any of the polar organic compounds remaining inert in this system. The end-capping agent is an aromatic compound like Benzene, Toluene, Xylene, Phenol, Anisole, Diphenyl Ether or any of their stable derivatives.

The alkane sulfonic acid mixture with its anhydride was found to be a solvent as well as a powerful catalyst for polymerization, of phenoxy phenoxy benzoic acid (PPBA) to give PEEK. It was also found that in MSA-MSAN system, the Methane Sulfonic Acid Anhydride (MSAN), gets easily reconverted into MSA after reaction work-up in water, so that recycling is possible and waste generation is minimal, MSA being recoverable and recyclable. Additionally, the MSAN need not be prepared separately and added during the reaction, but can also be prepared in-situ. When the reaction mass is added into water during the work-up of the reaction, the acid remains dissolved in water and the polymer easily precipitates out. The polymer is isolated by filtration, and is washed and dried. Any unreacted anhydride present in the reaction mass gets reconverted into the acid by reaction with water during the work-up. The resultant acid and water mixture can be easily separated by fractional distillation and both the acid and water can be recycled for the next batch.

In MSA-P$_2$O$_5$ system, similarly, MSA and H$_3$PO$_4$ are formed on precipitation of PEEK in water, from which MSA can be separated and reused. Thus, a significant advantage of our process is the ease of work-up and isolation of polymer due to the use of aqueous system for precipitation of PEEK. Further purification of PEEK is required to remove traces of acid, which can be accomplished by washing with hot water containing alkali and refluxing in water again to remove last traces of salt and alkali.

Generation of MSAN is readily carried out with any of the condensing agents. Thionyl Chloride (SOCl$_2$) or Phosphorous Pentoxide are the preferred reagents, due again to the ease of operation and feasibility of using the by-products, with minimum waste generation.

SOCl$_2$ reacts with MSA to give flue gasses SO$_2$ and HCl, which can be reacted back to give SOCl$_2$, and recycled, (Geiko V. I., Gladushko et. al. Khim. Khim. Tecknol. 1985, 28(5)-4 (Russ)). With P$_2$O$_5$, similar treatment yields H$_3$PO$_4$, a useful acid, which also can be separated from its mixture with MSA by extraction with suitable solvents or by fractional distillation of MSA and used as such. Such recycling was not achievable when a common catalyst like AlCl$_3$ was used for polymerization.

The invention of this process makes it possible to prepare PEEK electrophilically using homogenous solutions. The old AlCl$_3$ process was heterogeneous making molecular weight control nearly impossible as PEEK tended to crystallise out of solution forming a slurry. In the present process, rate of polymerization reaction and ultimate molecular weights can be readily controlled by a proper choice of reaction temperature, monomer concentration, and the quantity of anhydride employed. Thus, the kinetics of polymerization is easily controlled. Another advantage is the use of an acid monomer as the precursor, instead of the acid chloride as the precursor in case of manufacture based on Freidel-Crafts synthesis with catalysts, like AlCl$_3$. As is widely known, an acid chloride is susceptible to hydrolysis, even in presence of trace quantities of water. These problems are overcome here by using acid monomer itself.

Another novel and important part of this invention is the end capping used for the removal of reactive end groups of PEEK. It has been shown using FTIR spectra that the PEEK chains contain a carboxyl group, —COOH, at one end. Such a group is known to be a reactive group, particularly at high processing temperatures of PEEK. It can thus lead to formation of cross-links or undergo other reactions disturbing rheology severely. To protect the PEEK produced by our method, a novel end capping process was carried out. The reaction mass was diluted with Toluene, after the desired Inherent Viscosity was attained. Over a period of a few hours, Toluene reacted with the chain end and formed a keto group, which shows low reactivity and high thermal stability unlike the carboxyl group. Other reagents like Benzene, Xylene, Phenol, Anisole, Diphenyl Ether etc. were also successfully used for end capping. This end capping is important to attain high thermal stability as will become evident from the examples. Thus, overall novel PEEK structures were developed which are melt processible exhibiting good thermal stability over extended periods of time at high temperatures of PEEK processing.

Another novel part of the invention is use of diluents such as $CH_2Cl_2$, Dichloroethane, Sulfolane, etc. Since the polymerization temperatures are low to moderate in the range of 60–100° C. only, towards the end, the reaction mass viscosity increases and it makes efficient stirring difficult. Addition of diluents, like $CH_2Cl_2$ or $CH_2Cl$—$CH_2Cl$ or Toluene, helps in keeping the solution stirrable and improves mixing. Another advantage derived by the addition of a diluent, which can be low boiling and immiscible with water, is that on precipitation in hot water, it simply boils off and thus gets readily separated. Another advantage of adding a diluent is that the precipitating PEEK is obtained in this case as fine granules or powder. Without such a diluent, lumps or thick fibres are obtained requiring further size reduction. Yet another advantage of using the diluent is that the PEEK obtained as powder contains less than 10% MSA entrapped in it, while the lumpy or fibrous PEEK contains as much as 15–25% MSA entrapped, requiring more exhaustive post-polymerization treatments.

After separation from the reaction mass by precipitation in water, the polymer is filtered and washed conveniently free of MSA and $H_3PO_4$, if any, as shown in the examples. PEEK is subsequently treated in refluxed water, followed by refluxing in alkaline solution. Alternately, an organic base like Dimethyl Formamide (DNMF) or Dimethyl Acetamide (DMAc), etc. can also be used. A Formic acid treatment is optionally given to PEEK samples with higher UV absorbance or high As values, to reduce them to lower As levels required by our invention and to improve its color from buff to white during powder stage.

It is a part of this invention that PEEK so produced has to be made completely free of the solvent, as even small quantities of the solvent left behind has very deleterious effect on the processability of PEEK at high temperatures.

Thus, PEEK by the above process can be prepared under controlled moderate to high molecular weights as shown by its Inh.V. and Gel Permeation Chromatography (GPC) molecular weights. It also has a controlled structure as shown by its solutions having moderate to low absorbance in UV spectra. As against an absorbance value, As, of less than 20 for linear nucleophilic PEEK, PEEK prepared by this method has As values in the range of 300–600. It has been postulated that this As value may possibly indicate presence of branch structure. However, no direct proof has yet been found to confirm such a postulate of branches on the backbone. However, this appears to have no influence on processibility when the reactive ends of the polymer are suitably capped. The reactive groups on PEEK of this invention can be suitably reacted to end cap the polymer. All these make it possible to obtain high thermal stability and also processibility for such PEEK. It is therefore understood that PEEK structures of our invention are essentially linear polymers with novel end groups.

Hence, an object of this invention is to provide novel Polyaryl Ether Ether Ketone (PEEK), prepared using electrophilic process but which is thermally stable and melt processible.

Another object of this invention is to provide PEEK of novel structure, which contains controlled negligible number of branches on the backbone and whose reactive end groups are capped.

Another object of the invention is to provide a process for the preparation of thermoplastic PEEK, which is carried out at low temperatures like 40°–100° C. and is therefore economically more attractive for commercial production. This process not only produces PEEK of high enough Inh.V. to be of practical interest but also helps in reduction of it's defects arising out of branch points and reactive end groups present on the backbone to make it thermally stable for high temperature processing and usage.

Another object of this invention is to provide a process for the production of PEEK, which minimises waste generation, due to the possibility of recycling its reactants.

According to the invention, there is provided a process for the production of a novel aromatic Polyaryl Ether Ether Ketone (PEEK), which involves polymerising Phenoxy phenoxy benzoic acid (PPBA) using alkyl sulfonic acid and a condensing agent with or without a diluent at 40–100° C. and subsequently end capping it using an end capping agent. Thereafter, separating PEEK from the reaction mixture by precipitation in water and giving further water treatments for purification. Further, treating it with organic solvent with or without Formic acid to improve the colour of the PEEK powder is also part of this invention.

The specific examples that follow will serve to illustrate the invention but should not be construed to limit the scope thereof.

EXAMPLE 1

Thionyl Chloride (238 g, 2.0 m) was charged into a clean, 4 neck, 1 liter glass flask equipped with a magnetic stirrer, a reflux condenser with chilled water circulation, scrubbing arrangement for off-gases, a thermowell, and a dropping funnel. Thionyl Chloride was heated to 50° C., and Methane Sulphonic acid, (96 g, 1 m), was gradually charged into it over a period of 1 h. The solution was then heated to 70° C. over a period of 2.5–3 h and subsequently to 75–80° C. over a period of additional 7 h. Thereafter, the solution-was maintained at 80° C. for 3 h. During the course of heating, the off-gases which were evolved were scrubbed in an alkali scrubber. After evolution of the off-gases had ceased, the reflux condenser was removed and system modified for downward distillation. Excess Thionyl Chloride was first distilled off at atmospheric pressure, up to 120° C., then the temperature was raised to 140° C., pressure reduced to 10 mm Hg, and an intermediate cut of volatile by-product was condensed and isolated.

Further distillation of the main cut was continued at 120–130° C. liquid temperature and absolute pressure of 1–2 mm Hg. This product, later referred to as condensing agent or MSA Anhydride (MSAN), was then used for polymerisation of Phenoxy Phenoxy Benzoic Acid (PPBA) in Methane Sulfonic Acid medium for preparation of PEEK. The yield of MSAN was typically 90–94% based on MSA. The process was scaled-up to generate sufficient quantity of condensing agent required for larger scale polymerisation batches.

In a clean four neck round bottom flask was charged 3640 g of Methane Sulfonic Acid (MSA). The liquid was heated to 60° C. and to this 1135 g of condensing agent, MSAN, preheated to 70° C. was charged. The condensing agent was prepared previously by the method described above. The mixture was maintained at 60° C. to form a homogenous solution, and 998 g of PPBA was then added to it. The solution was maintained at 60±1° C. for 7 h and samples were withdrawn periodically to monitor the solution viscosity. Polymerisation reaction was terminated when the desired solution viscosity, corresponding to an Inherent Viscosity of 0.92 dl/g (of a 0.2% solution in conc. $H_2SO_4$ at 25° C.) was attained. Termination was done by addition of 554 g Diphenyl Ether, (1 m/m) and 2445 g of MSA (750 g/m). The endcapping reaction was allowed to continue for 10 h, at 60° C. by which time the terminal —COOH groups of the polymer were converted to —CO—$R_4$—O—$R_1$, (where $R_1$ represents a phenyl ring), as seen by the disappearance of a peak at 1720 cm$^{-1}$ in the FTIR spectra. The reaction mass was then precipitated in 22000 ml water to extract off the acid from the polymer. The precipitated polymer was then repeatedly extracted with water until the pH of the filtrate was neutral. The wet solids were then treated with Dimethyl Acetamide (DMAc) and again with water and then dried. The dry polymer, which predominantly consisted of the repeat unit of the structure (I),

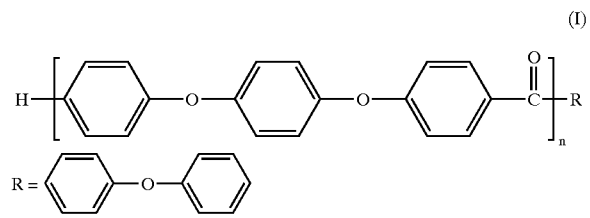

(I)

was then extruded in a laboratory extruder to obtain dark brown coloured pellets. When the wet solids from the same lot were treated with DMAc containing up to 25 ml of 85% Formic Acid (for 100 g polymer), the pellets after extrusion were significantly lighter in color. The polymer exhibited a Tg of 150.3° C., Tc of 180.1° C., and Tm of 341.8° C. The brown pellets exhibited good flow with Melt Volumetric Flow value of 18.3 cc/10 min (at 400° C., 7.06 kg, 6 min hold time) and 17.0 cc/10 min (400° C., 7.06 kg, 60 min hold time), indicating excellent thermal stability. The extrudate from the melt flow test had a glossy appearance. Thus, a product with good flow and thermal characteristics was obtained. The results of PEEK produced by the Example 1 were similar to those of PEEK known in prior art which had the following values; Tg of 149.0° C., Tc of 185.1° C., Tm of 342.2° C. and melt volumetric values of 18.9 cc/10 min (at 400° C., 7.06 kg, 6 min hold time) and 19.3 cc/10 min (400° C., 7.06 kg, 60 min hold time).

EXAMPLE 2

The procedure of example 1 was reproduced exactly on a larger scale wherein 317 kg MSA was charged in a 2500 l glass lined reactor, heated to 60 ° C. and 99 kg of condensing agent MSAN was added to it. The solution was maintained at 60° C. and 87 kg of PPBA was added to it. The solution was maintained at 60±1° C. for 10.5 h and samples were withdrawn periodically to monitor the solution viscosity. Polymerisation reaction was terminated when the desired solution viscosity, corresponding to an Inherent Viscosity of 0.88 dl/g (of a 0.2% solution in conc. $H_2SO_4$ at 25° C.) was attained. Termination was accomplished by addition of 48 kg Diphenyl Ether and 212 kg of MSA. The endcapping reaction was allowed to continue for 10 h, at 60° C. exactly as in Example 1. The reaction mass was then precipitated in 1900 l water to extract off the acid from the polymer.

The precipitated polymer was then repeatedly extracted with water and DMAc exactly as in Example 1, and then dried. The polymer was then extruded in a laboratory extruder, injection moulded into test specimens and tested as per standard ASTM test procedures. The results of mechanical properties listed below suggest that very good mechanical properties are attained for PEEK made by the procedure of Example 1 and the properties are comparable to those known for commercially available PEEK.

TABLE 1

| Property | Results | Commercial PEEK |
|---|---|---|
| Flexural strength (MPa) | 156 | 145 |
| Flexural Modulus (GPa) | 4.14 | 3.95 |
| Tensile strength (MPa) | 99 | 98 |
| Tensile modulus (GPa) | 4.0 | 4.5 |
| Elongation at break (%) | 28 | 44 |

EXAMPLE 3

Polymerisation procedure was repeated exactly as described in Example 2, except that the reaction was terminated by the addition of suitable amounts of Diphenyl Ether and Methane Sulfonic Acid at reduced solution viscosity to give Inh. Viscosity of 0.79 dl/g. Subsequent water and DMAc treatments were completed as in Example 1 above, and the polymer powder was extruded in a laboratory extruder. The pellets so obtained were characterised for the thermal and melt flow behaviour. The polymer exhibited a Tg of 148.2° C., Tc of 181.9° C. and Tm 345.5° C. The, melt flow values were 29 cc/10 min (at 400° C., 2.16 kg, for 6 min hold time) and 23 cc/10 min (at 400° C., 2.16 kg for 60 min hold time), indicating excellent thermal stability. The extrudates from the melt flow apparatus at both 6 and 60 min had a glossy appearance. Thus, the thermal and rheological characteristics clearly indicated that the product obtained had linear structure with negligible or no branching, which would have decreased its Tg & Tm as well as reduced flow through Melt Flow Indexer. It also showed that PEEK with an increased melt flow value can readily be prepared by the procedure of Example 3.

EXAMPLE 4

The polymerisation procedure of Example 3 was repeated except that no endcapping agent was added. Polymerization was continued until desired viscosity was attained and the mass was then precipitated under conditions similar to that of example 3, treated with water and DMAc and then dried. This polymer when tested for melt flow at 400° C., 2.16 kg, and 6 min exhibited a lower value of 17 cc/10 min compared to resin of example 3. The extrudate exhibited a very rough surface indicative of gelation and after 60 min at 400° C. the resin was degraded into powder which did not flow through the melt flow apparatus. This result clearly highlights the significance of proper endcapping of the polymer chains to eliminate reactive end-groups and impart proper structural requirements to obtain good processability as well as thermal stability. The polymer exhibited a Tg of 150.7° C., Tc of 182.3° C., Tm of 328,7° C. Therefore, the melt temperature of PEEK not endcapped was nearly 10–12° C. lower than that of PEEK endcapped with Diphenyl Ether as is Example 1 above, again showing susceptibility to high temperature degradation.

EXAMPLES 5–6

The examples below demonstrate the influence of varying quantities of condensing agent, MSAN, on the Inherent Viscosity of the polymer. Thus, PEEK was prepared by the procedure of Example 1, except that in one example (#5) only 1.0 m of MSAN was used while in another example (#6) 2.0 m of MSAN was charged into MSA per mole of PPBA. Reaction was continued for the stipulated time interval, thereafter, the polymer was terminated by addition of Diphenyl ether (1 m/m PPBA). The end-capped reaction mass was then diluted with MSA (750 g/m PPBA) and precipitated in water to isolate the polymer, and recover the solvent. The wet polymer was treated with water and DMAc as in Example 1 and Inherent Viscosity was determined as in examples above.

TABLE 2

| Example | Condensing Agent (m/m PPBA) | Reaction Time (h) | Inh. V. (dl/g) |
|---|---|---|---|
| 5 | 1 | 50 | 0.71 |
| 6 | 2 | 20 | 1.15 |

Thus, with 2 mol of MSAN/m PPBA, good reaction rates and Inherent Viscosity are obtained within 20 h of polymerization time. The treated sample of Example 6 further showed Melt Volumetric Rates of 2.98 and 2.41 cc/10 min in MVR test at 2.16 kg load and 400° C. with respective preheating times of 6 and 60 minutes indicating that it has excellent thermal stability. The polymer structure was verified further by conducting $^{13}$C NMR analysis of the polymer using a 200 MHz NMR for up to 90000 scans, which showed absence of any branch structure.

EXAMPLES 7–9

This example demonstrates the effect of temperature on the reaction conditions. Reactions were conducted at 40°, 80°, and 100° C. instead of 60° C. and procedure was followed as in example 3. The reactions were terminated at 12 h and the polymers were characterised for their inherent viscosity.

TABLE 3

| Ex. No. | Reaction Temp (° C.) | Inherent Viscosity (dl/g) |
|---|---|---|
| 7 | 40 | 0.60 |
| 8 | 80 | 0.40 |
| 9 | 100 | 0.21 |

Thus, it can be seen that the process is useful at temperature range of 40° C. to 100° C. range, though at temperatures below 60° C., the reaction rate is somewhat slower resulting in lower Inherent Viscosity build-up compared to example 3, while at higher temperatures, also, the Inherent Viscosity is reduced.

EXAMPLE 10

In a 63 liter glass lined reactor equipped with an impeller and high powered motor was siphoned Methanesulphonic acid (49.50 kg, 515.6 m) and heated to 60° C. Free flowing phosphorus pentoxide (10.0 kg, 70.42 m) was charged into the reactor under stirring at 60° C. and the mixture was heated at this temperature till all $P_2O_5$ dissolved. Phenoxy phenoxy benzoic acid (10.0 kg, 32.68 mole) was added and the reaction was continued at this temperature for 12.5 h. The polymerization was marked by increase in viscosity. The polymerization was terminated at 12.5 h at which time the Inh. Viscosity was 1.39 dl/g. (Measured in 98% Sulphuric acid at 25° C. at 0.2% concentration). The reaction mass was then diluted with 50 kg of Methanesulphonic acid and the polymer was precipitated in 200 l water. The polymer was obtained as pink colored strands, which were crushed and filtered. The MSA recovered in the filtrate was about 66%. It was then refluxed in 100L of water for 2 h to leach out more Methanesulphonic acid. The polymer after filtration was then pressure cooked at 170° C. with 100 L, 0.5 N $NaHCO_3$ for 1 h, followed by several washes till filtrate was neutral to pH. The above polymer was dried at 120° C./10 h till the weight loss was less than 0.1%. The yield of the polymer was 97%.

200 g of the dried polymer was then redissolved at 60° C. in 2 kg of MSA containing 40 g of dissolved phosphorus pentoxide in order to endcapp the polymer with Toluene as the endcapping agent. 150 ml of Toluene was added and the reaction mixture was stirred at 60° C. for 10 h. PEEK was precipitated and worked up as described above to give dry powder essentially free of acids. When FTIR spectra were measured, the Toluene treated polymer showed absence of peak in FTIR at 1720 cm-1 vs. a peak for untreated sample. This peak signifies presence of —COOH group, which was absent in Toluene treated PEEK sample indicating end-capping to have occurred. The treated end-capped samples further showed MVR of 2.59 and 2.41 in MVR test with respective preheating times of 6 and 60 minutes at 400° C. indicating that it has excellent thermal stability. The polymer which predominantly consisted of the repeat unit (II),

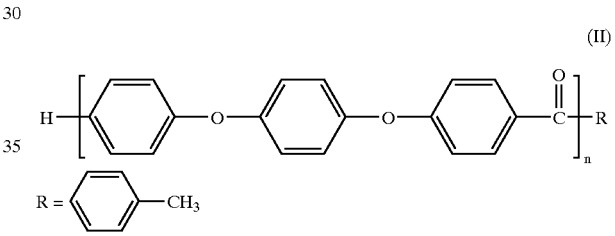

(II)

had a Tm of 338° C. and a Tg of 150° C. using the method of differential scanning calorimetry.

A thermal stability test was conducted in a Haake Rheocord. In the Haake test, 45 g of the polymer was melted in a mixer bowl equipped with roller rotors. The melt stability was determined by the change in torque of the polymer melt under shear at 45 rpm and 380° C. In the Haake test the melt was found to be stable for 60 minutes with an initial torque of 4.5 N-m and finally reaching 6.0 N-m. The samples removed at 30 and 60 minutes dissolved in TCB (1,2,4-Trichloro benzene)-Phenol mixture indicating no significant crosslinking.

Thus, PEEK having good molecular weight as manifested by high Inherent Viscosity, melt processible and having good thermal stability can be made by the above process.

EXAMPLE 11

The polymerization was conducted as reported in Example 10 and terminated after 10 h followed by in-situ end capping with Toluene as the end-capping agent. It was worked up as mentioned in example 3, except that EDC was used as the diluent and the polymer had molecular weight corresponding to an Inh. V. of 1.1 dl/g. The polymer was melt stable at 380° C. for 30 minutes. It was extruded and injection molded for evaluation of its mechanical properties. The results are tabulated below.

TABLE 4

| Property | Results | Commercial PEEK |
| --- | --- | --- |
| Flexural strength (MPa) | 181 | 145 |
| Flexural Modulus (GPa) | 3.99 | 3.95 |
| Tensile strength (MPa) | 87 | 98 |
| Tensile modulus (GPa) | 3.93 | 4.5 |
| Elongation at break (%) | 21.8 | 44.0 |

Thus, PEEK with good molecular weight, easy processability, good thermal stability and excellent mechanical properties was made by the above process.

EXAMPLE 12

The polymerization was conducted as in Example 10 on 33 mole scale, i.e., using 10 kg of PPBA and other reagents on proportionate basis, but additionally 1 mol % (56.1 g) of Diphenyl ether (DPE), which acts an end-capping agent, was added along with MSA before addition of PPBA. Thus, a fraction of end-capping agent required was added right at the onset of polymerization stage. Polymerization was continued as in example 5 and after 12 h, another 56.1 g of DPE was added to complete the end-capping. The second stage of end-capping was continued for additional 12 h. The batch was then worked-up as in example 10 with MSA as the diluent and a product with Inherent Viscosity of 1.12 dl/g was obtained. The polymer was melt stable at 380° C. and exhibited very good mechanical properties as listed in the Table below.

TABLE 5

| Property | Results | Commercial PEEK |
| --- | --- | --- |
| Flexural strength (MPa) | 139 | 145 |
| Flexural Modulus (GPa) | 3.66 | 3.95 |
| Tensile strength (MPa) | 92 | 98 |
| Tensile modulus (GPa) | 4.2 | 4.5 |
| Elongation at break (%) | 44.0 | 44.0 |

Thus, even by adding end-capping agent from the beginning in the polymerization stage, a product with good molecular weight, excellent mechanical properties and thermal stability could be obtained by the above method.

EXAMPLES 13–17

The examples below demonstrate the effectiveness of other end-capping agents to thermal stability of the polymer. The polymerization was conducted as mentioned in Example 10, except only half the amount of phosphorus pentoxide was used. The reaction was terminated when desired viscosity was obtained. The polymer was then worked up as mentioned in Example 10, except for the fact that reaction mass was diluted with EDC instead of MSA.

200 g of the polymer so obtained was re-dissolved in 2 kg of Methanesulphonic acid containing dissolved 40 g $P_2O_5$. 150 ml of end capping agent was added and it was stirred at 60° C. and again worked up as in Example 10 to free it from MSA and any other impurities. FTIR indicated disappearance of peak at 1720 cm-1 ensuring complete end-capping. All the polymer samples were subjected to stability conditions as mentioned in Example 10. The end capped samples had shown good thermal stability and the samples removed at 30 minutes and 60 minutes of Haake run at 380° C. were found to be completely soluble in Dichloroacetic acid and Phenol-1,2,4 Trichlorobenzene mixture (50:50 w/w). The GPC of the samples also indicated no measurable change in the molecular weights of these end-capped polymers. For comparative purpose, an unendcapped PEEK sample was also tested in the Haake, and the results are presented in the Table below. High torque value shown by un-end-capped PEEK is clear proof that it has formed cross-links and has gelled, while end-capped PEEK of comparable Inh. Visc. has retained its original structure.

TABLE 6

| Ex No. | End capping Agent Used | Torque (N-m) 10 min | 60 min |
| --- | --- | --- | --- |
| 13 | Unendcapped | 7.5 | 8.9 |
| 14 | Benzene | 2.6 | 4.2 |
| 15 | Toluene | 1.7 | 2.3 |
| 16 | Xylene | 2.5 | 4.9 |
| 17 | Anisole | 2.2 | 4.9 |

EXAMPLE 18

In a clean, 4 neck, 1 liter glass reactor equipped with a high powered agitator, thermowell, reflux condenser, and scrubbing arrangement was taken Methanesulphonic acid (300 g, 3.125 mole). Thionyl chloride (96.0 g, 0.8 mole) was added drop wise and temperature slowly raised from 40° C. to 100° C., and maintained till all $SO_2$/HCl ceased to evolve. 100 mm of Hg vacuum was applied to remove dissolved gases. The temperature was reduced to 60° C. and PPBA (60.0 g, 0.2 mole) was added. The polymerization was marked by an increase in viscosity. The table gives the progress of the reaction with time. The inherent viscosity was determined as described in examples above.

TABLE 7

| Time (h) | Inh. Visc. (dl/g) |
| --- | --- |
| 10.0 | 0.89 |
| 20.0 | 1.20 |
| 25.0 | 1.31 |
| 30.0 | 1.41 |

Thus, even using $SOCl_2$ in situ as the condensing agent, one can make PEEK with Inh. Viscosity as high as 1.4 dl/g.

EXAMPLE 19

In another example, PEEK was prepared by the procedure of Example 18 above, but after 10 h of polymerization, 60 ml of Toluene was added to the reaction mass and stirred at this temperature for 10 h. The reaction mass was precipitated at 60° C. in 600 g water. It was further refluxed for 1 h in 600 g of water and filtered. Finally, the pink colored polymer was pressure cooked in 0.5 N $NaHCO_3$ solution for 1 h at 170° C. PEEK so obtained was white colored which was dried at 150° C. for 4 hr, giving a yield of 97.0%. It's DSC curve showed a Tg of 149° C. and Tm of 345.8° C. The inherent viscosity of the sample was 0.88 dl/g. A small sample of the above polymer was refluxed in 85% Formic acid for 10 h and filtered. 45 g of the polymer was then heated to 380° C. in a Haake Rheocord equipped with roller rotor and a themostated mixing head maintained at 380° C. The torque was taken as measure of the stability of the polymer. The torque was found to be constant for 60 min at 1.5 Nm indicating that the polymer was highly thermally stable. It is to be noted here that the color of the polymer was lighter when formic acid treatment was given to the polymer. Thus, even with this process of using $SOCl_2$ as the condensing agent, and suitable end-capping agent, PEEK with good molecular weight, easy processibility and good thermal stabilty could be made.

EXAMPLES 20–22

The examples below demonstrate the influence of concentration of the condensing agent on the Inherent Viscosity of the polymer. Thus, PEEK was prepared by the procedure of Example 19, except that the quantity of $SOCl_2$ was varied from 2 to 6 moles per mole of PPBA. Reaction was continued for the stipulated time interval, thereafter the mass was precipitated in water to isolate the polymer and recover the solvent. The inherent viscosity was then determined as in examples above.

TABLE 8

| Example | $SOCl_2$ (m/m PPBA) | Inh. V. (dl/g) |
|---|---|---|
| 20 | 2 | 0.5 |
| 21 | 4 | 1.4 |
| 22 | 6 | 1.0 |

Thus, with 4 m/m $SOCl_2$ an optimum value of Inh. V. of 1.4 dl/g is obtained.

What is claimed is:

1. A melt processible Polyether Ether Ketone polymer containing reduced concentration of any reactive end-groups on the backbone and having predominantly the repeat units (I) with a suitably modified end group OR:

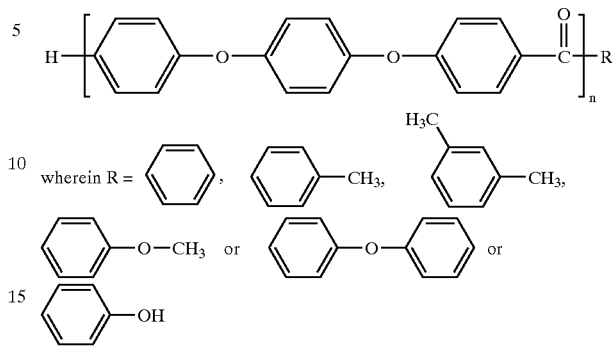

or any of their stable derivatives.

2. A melt processible PEEK polymer with repeat unit as shown in claim 1 above and with preferred one end group being -Ph-O-Ph (where Ph represents an aromatic ring).

3. A melt processible PEEK polymer with repeat unit as shown in claim 1 above and with preferred one end group being -Ph-Me or -Ph-O-Me or -Ph(Me)$_2$.

* * * * *